(12) United States Patent
Shen et al.

(10) Patent No.: US 11,010,159 B2
(45) Date of Patent: May 18, 2021

(54) BIT PROCESSING INVOLVING BIT-LEVEL PERMUTATION INSTRUCTIONS OR OPERATIONS

(71) Applicant: Arm Limited, Cambridge (GB)

(72) Inventors: Xiaoyang Shen, Alpex-Maritimes (FR); Cedric Denis Robert Airaud, Saint Laurent du Var (FR); Luca Nassi, Antibes (FR); Damien Robin Martin, Alpes-Maritimes (FR)

(73) Assignee: ARM LIMITED, Cambridge (GB)

( * ) Notice: Subject to any disclaimer, the term of this patent is extended or adjusted under 35 U.S.C. 154(b) by 257 days.

(21) Appl. No.: 16/118,528

(22) Filed: Aug. 31, 2018

(65) Prior Publication Data
US 2020/0073660 A1 Mar. 5, 2020

(51) Int. Cl.
*G06F 9/30* (2018.01)
*G06F 5/01* (2006.01)

(52) U.S. Cl.
CPC ............ *G06F 9/30018* (2013.01); *G06F 5/01* (2013.01); *G06F 9/30185* (2013.01)

(58) Field of Classification Search
CPC ..... G06F 9/30018; G06F 9/30185; G06F 5/01
See application file for complete search history.

(56) References Cited

U.S. PATENT DOCUMENTS

| 9,002,915 B1* | 4/2015 | Young | G06F 5/015 |
| | | | 708/209 |
| 2013/0326192 A1* | 12/2013 | Ould-Ahmed-Vall | |
| | | | G06F 9/30098 |
| | | | 712/205 |
| 2015/0039662 A1* | 2/2015 | Iyer | G06F 5/012 |
| | | | 708/209 |
| 2017/0103305 A1* | 4/2017 | Henry | G06N 3/063 |

OTHER PUBLICATIONS

Burgess et al., U.S. Appl. No. 15/711,116, filed Sep. 21, 2017.

* cited by examiner

*Primary Examiner* — Michael D. Yaary
(74) *Attorney, Agent, or Firm* — Nixon & Vanderhye, P.C.

(57) ABSTRACT

Apparatus comprises counter and bit-shift circuitry to provide a succession of processing stages each comprising a count operation stage and a corresponding bit-shift stage, each processing stage operating with respect to a set of contiguous n-bit groups of bit positions, where n is 1 for a first processing stage and n doubles from one processing stage in the succession of processing stages to a next processing stage in the succession of processing stages; each count operation stage being configured to generate, for a first set of alternate instances of the n-bit groups of bit positions, count values indicating a respective number of bits of a predetermined bit value in a mask data word; and each bit-shift stage being configured to generate a bit-shifted data word by bit-shifting bits of a data word to be processed, for (Continued)

a second set of alternate instances of the n-bit groups of bit positions complementary to the first set, by respective numbers of bit positions dependent upon the count values generated by the respective count operation stage, in which the bit-shifted data word for one bit-shift stage in the succession of processing stages is used as the data word to be processed by the next bit-shift stage in the succession of processing stages.

13 Claims, 11 Drawing Sheets

BIT PROCESSING INVOLVING BIT-LEVEL PERMUTATION INSTRUCTIONS OR OPERATIONS

BACKGROUND

This disclosure relates to bit processing.

Some bit processing involves so-called bit-level permutation instructions or operations in which bits of an input ordered bit array (such as an input word) are permuted to form an output ordered bit array according to values of control bits such as so-called sieve or mask bits.

In previously proposed systems, the mask needs to be analysed to determine how much each data bit must be shifted by (and in which direction) and an n-bit data path comprising the equivalent of n n-to-1 multiplexers is needed to perform the shifting. Control circuitry in a previously proposed arrangement can be complicated and can lack flexibility, in that it is dedicated to a particular permutation operation.

SUMMARY

In an example arrangement there is provided apparatus comprising:

counter and bit-shift circuitry to provide a succession of processing stages each comprising a count operation stage and a corresponding bit-shift stage, each processing stage operating with respect to a set of contiguous n-bit groups of bit positions, where n is 1 for a first processing stage and n doubles from one processing stage in the succession of processing stages to a next processing stage in the succession of processing stages;

each count operation stage being configured to generate, for a first set of alternate instances of the n-bit groups of bit positions, count values indicating a respective number of bits of a predetermined bit value in a mask data word; and each bit-shift stage being configured to generate a bit-shifted data word by bit-shifting bits of a data word to be processed, for a second set of alternate instances of the n-bit groups of bit positions complementary to the first set, by respective numbers of bit positions dependent upon the count values generated by the respective count operation stage, in which the bit-shifted data word for one bit-shift stage in the succession of processing stages is used as the data word to be processed by the next bit-shift stage in the succession of processing stages.

In another example arrangement there is provided apparatus comprising:

counter circuitry configured to count, for each bit position, n, in a mask data word, the number of instances, m, of a predetermined bit value in all bit positions of the mask data word less significant than the bit position n;

bit setting circuitry to set a bit at a bit position n in an intermediate data word to be equal to a bit at a bit position m in an input data word; and output circuitry configured to generate an output data word as a logical combination of the intermediate data word and the mask data word.

In another example arrangement there is provided a method comprising:

for a succession of processing stages each comprising a count operation stage and a corresponding bit-shift stage, each processing stage operating with respect to a set of contiguous n-bit groups of bit positions, where n is 1 for a first processing stage and n doubles from one processing stage in the succession of processing stages to a next processing stage in the succession of processing stages:

each count operation stage generating, for a first set of alternate instances of the n-bit groups of bit positions, count values indicating a respective number of bits of a predetermined bit value in a mask data word; and each bit-shift stage generating a bit-shifted data word by bit-shifting bits of a data word to be processed, for a second set of alternate instances of the n-bit groups of bit positions complementary to the first set, by respective numbers of bit positions dependent upon the count values generated by the respective count operation stage, in which the bit-shifted data word for one bit-shift stage in the succession of processing stages is used as the data word to be processed by the next bit-shift stage in the succession of processing stages.

In another example arrangement there is provided a method comprising:

counting, for each bit position, n, in a mask data word, the number of instances, m, of a predetermined bit value in all bit positions of the mask data word less significant than the bit position;

setting a bit at a bit position n in an intermediate data word to be equal to a bit at a bit position m in an input data word; and generating an output data word as a logical combination of the intermediate data word and the mask data word.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

In the present description, reference is made to U.S. patent application Ser. No. 15/711,116, the contents of which are incorporated into the present description by reference.

Various example arrangements will be discussed below. The example arrangements can use a common circuitry or respective separate instances of circuitry to perform at least three example bit-level permutation instructions BEXT, BDEP, and BGRP, depending on configuration information, which are defined as follows:

BDEP: data bits (from least to most significant) are deposited into the output according to the contents of mask. For each so-called mask bit, if mask=1, a data bit is deposited into output. Otherwise, the output bit is set to 0. This procedure is repeated for all mask bits.

BEXT: data bits located in positions indicated by active mask bits are extracted and copied in order to the least significant bits in the output.

BGRP: data bits located in positions indicated by active mask bits are extracted from data and copied to the least significant bits in the output. In addition, data bits located in positions indicated by inactive mask bits are extracted from data and copied to the adjacent free output bits.

In these bit permutation instructions, different input data bits are shifted by different amounts depending on the values of the mask bits. For example, executing BDEP using the 8-bit mask 8'b1011_0101 and the 8-bit data string 'abcd_efgh' results in 'd0ef_0g0h', where bit 'd' in the data has shifted 3 places to the left, bits 'e' and 'f' have shifted 2 places to the left, bit 'g' by 1 place to the left, and bit 'h' by no places. Executing BEXT, using the same mask and data, results in '000a_cdfh' where bit 'a' in the data has shifted 3 places to the right, bits 'c' and 'd' have shifted 2 places to the right, bit 'f' by 1 place to the right, and bit 'h' by no places. Executing BGRP, with the same mask and data, results in 'bega_cdfh', where bits 'b', 'e' and 'g' have all shifted left by different amounts and the other data bits have shifted right in accordance with BEXT.

Each instance of bitwise processing in the discussion below performs the processing associated with a respective mask bit.

Figure 1:
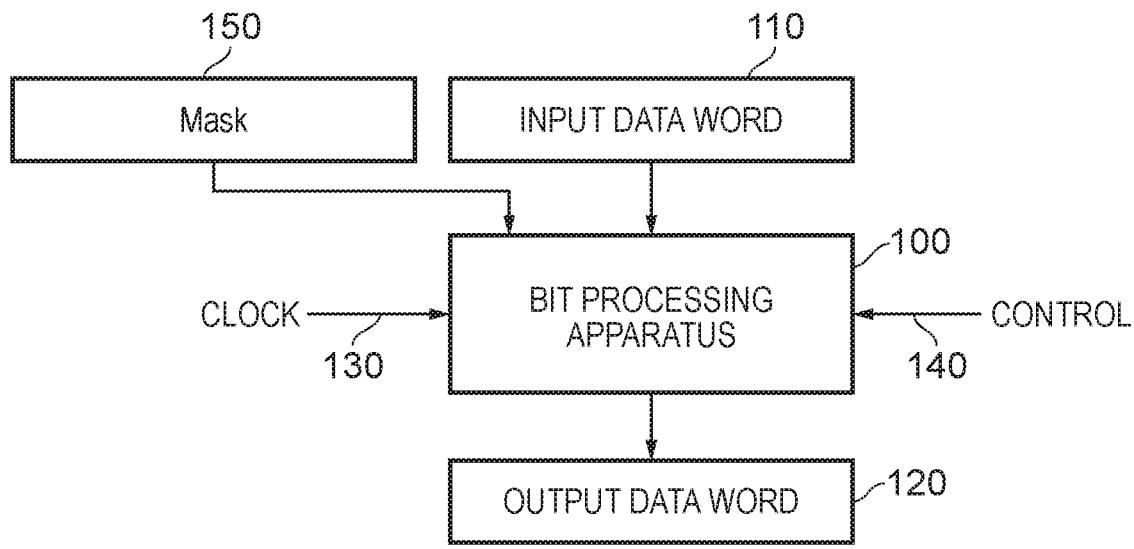
FIG. 1 schematically illustrates bit processing apparatus.

FIG. 1 schematically illustrates a bit processing apparatus 100 which acts on an input data word 110 to generate an output data word 120 representing the input data word subjected to a bit permutation operation. The bit processing apparatus 100 operates under the control of a clock signal 130 and, optionally, according to a control signal 140 specifying a particular bit permutation operation (such as BEXT, BDEP or BGRP) to be performed upon the input data word.

The input data word may have a word length in bits appropriate to the system in which it is being used. For example, the discussions below relate to 8-bit input data words (resulting in 8-bit output data words) but other lengths may be used, for example, 16, 32, 64 or 128 bit input data words.

The bit processing apparatus 100 is also responsive to a mask word 150. The mask word 150 has the same bit length as the input data word 110 and the output data word 120, and each bit position in the mask data word provides a bit which defines a particular aspect of the bit permutation operation to be performed by the bit processing apparatus 100.

Figure 2:
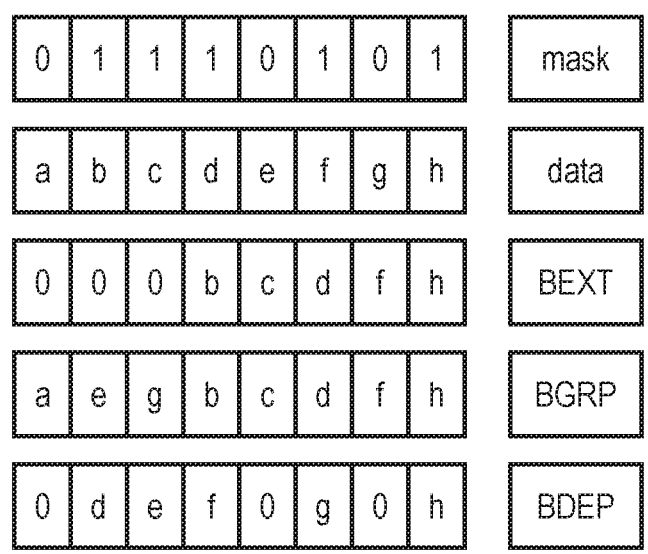
FIG. 2 schematically illustrates a set of permutation operations.

In an example arrangement shown in FIG. 2, an example mask data word of 01110101 and an example input data word of abcdefgh result in the following output data words 120:

BEXT operation:
000bcdfh
BGRP operation:
aegbcdfh
BDEP operation:
0def0g0h

Figure 3:
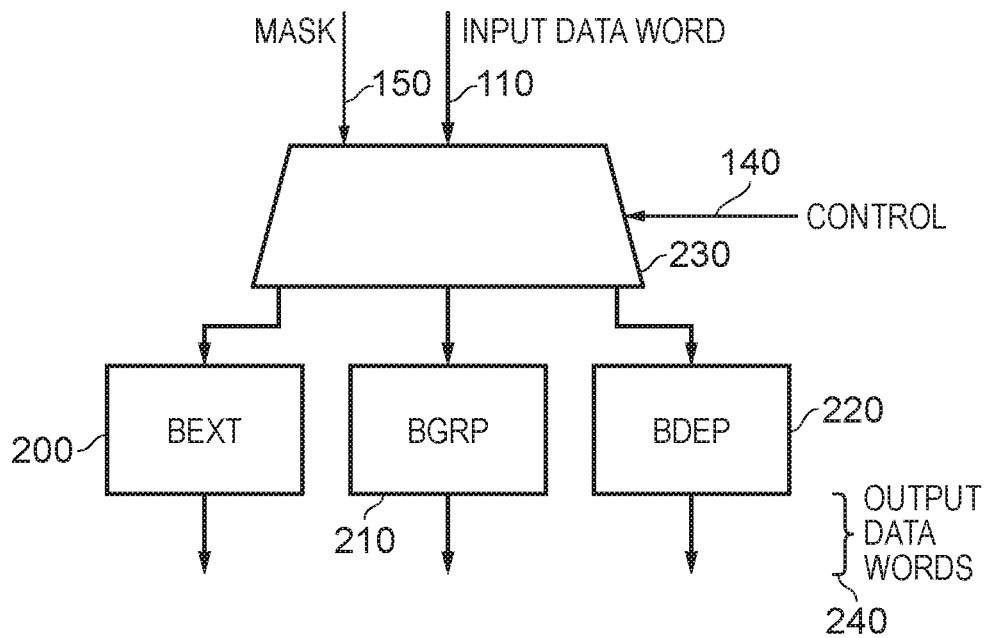
FIG. 3 schematically illustrates an example of bit processing apparatus.

FIG. 3 schematically illustrates an example of the bit processing apparatus 100 in which, under the control of the control signal 140, the input data word 110 and the mask data word 150 are provided to one or more of a BEXT processor 200, a BGRP processor 210 and a BDEP processor 220, under the control of a schematic demultiplexer 230 so as to generate respective output data words 240. This therefore provides an example in which the processing for each of the three bit permutation operations under the current discussion is carried out separately.

FIG. 3 therefore provides an example of data processing circuitry comprising BEXT, BGRP and BDEP circuitry as discussed below. Note however that in some example arrangements to be discussed further below, significant portions of circuitry can be shared between these three circuitries.

Note that in an alternative arrangement, the mask 150 and input data word 110 could be provided to all three processors 200, 210, 220 such that all three outputs BEXT, BGRP, BDEP are generated and the appropriate one is forwarded for use by further circuitry under the control of the control signal 140. Such an arrangement is particularly suited to circuitries such as those to be described below which can share some functionality (such as counting functionality) between the three processors 200, 210, 220.

BGRP Operation Example

In the BGRP operation, data bits in positions indicated by active mask bits are extracted and copied to the least significant bits of the output. In addition, data bits located in positions indicated by inactive mask bits are extracted and copied to the adjacent free output bits.

Figure 4:
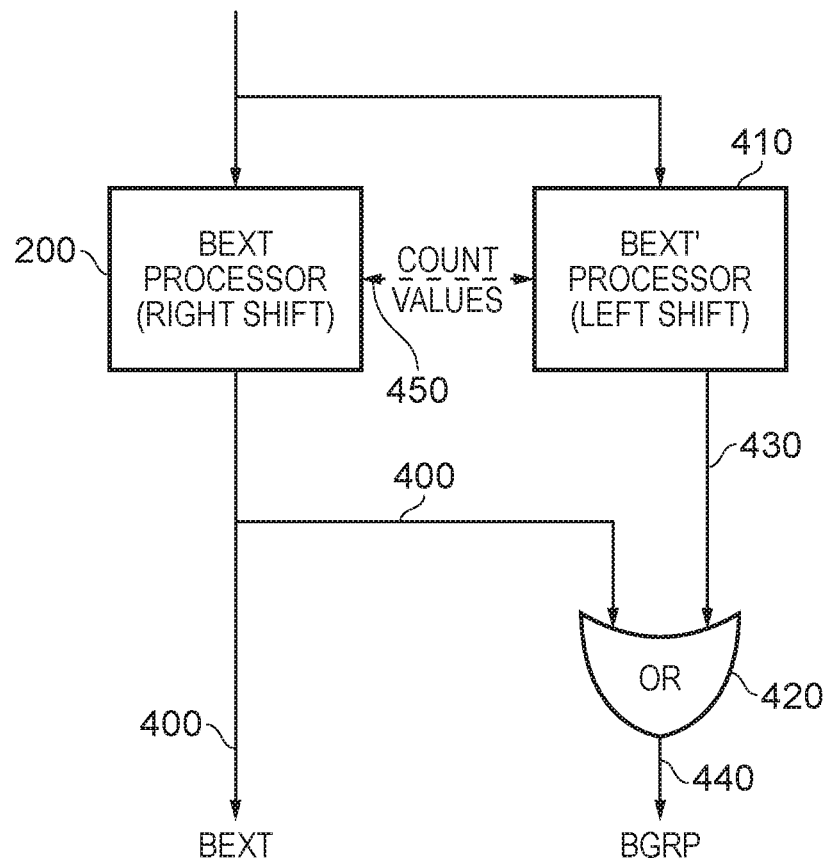
FIG. 4 schematically illustrates a BGRP processor.

Referring to FIG. 4, the BGRP function can in fact be achieved using the results, in part, of the BEXT processing. Referring back to FIG. 2, for the particular mask and data words in that example, the BEXT output is 000bcdfh. If the BEXT operation were carried out such that bits of the input data word were shifted left rather than right under the control of one bits (rather than zero bits) in the mask data word, then such an operation BEXT' would result in the output abg000000. It can therefore be seen that the output BGRP is in fact a bitwise OR combination of the output BEXT and the output BEXT', giving a BGRP output of aegbcdfh.

In FIG. 4, the BEXT processor 200 can generate the BEXT output 400 itself. A BEXT' processor (using a left shift and active 1 values in the mask data word) 410 is also provided along with a logical bitwise OR gate 420 to combine the output 400 and the BEXT' output 430 to generate the BGRP output 440.

In the examples to be discussed below, count values are generated for BEXT' which are indicative of counts of, for example, numbers of one bits at various bit positions or groups of bit positions. In some examples, the count values required by the BEXT' processor can be derived as a compliment of the count values of zeroes derived in the BEXT processor. Therefore, a data connection 450 is provided to allow the sharing of count values, and therefore the de-duplication of circuitry, to be carried out between the BEXT processor 200 and the BEXT' processor 410. These arrangements will be discussed further below.

FIG. 4 therefore provides an example of apparatus comprising:
first apparatus 200 as discussed below (BEXT);
second apparatus 410 as discussed below (BEXT');
in which the first apparatus and the second apparatus are configured to operate with respect to a common input data word and a common mask data word; and
combiner circuitry 420 to combine the bit-shifted data word generated by the first circuitry and the bit-shifted data word generated by the second circuitry to generate an output data word.

For example, the combiner circuitry 420 may be configured to provide a bitwise logical OR combination.

BEXT Operation Example

In the BEXT arrangement, the circuitry is configured to generate an n-bit output ordered bit array in which bits of an n-bit input ordered bit array at bit positions of active bits of an n-bit-shift control bit array are provided, starting from an earliest bit position in the n-bit output ordered bit array. In other words, data bits at positions indicated by active "mask" bits (discussed below) are extracted and copied in order to the least significant bits in the output.

Figure 5:
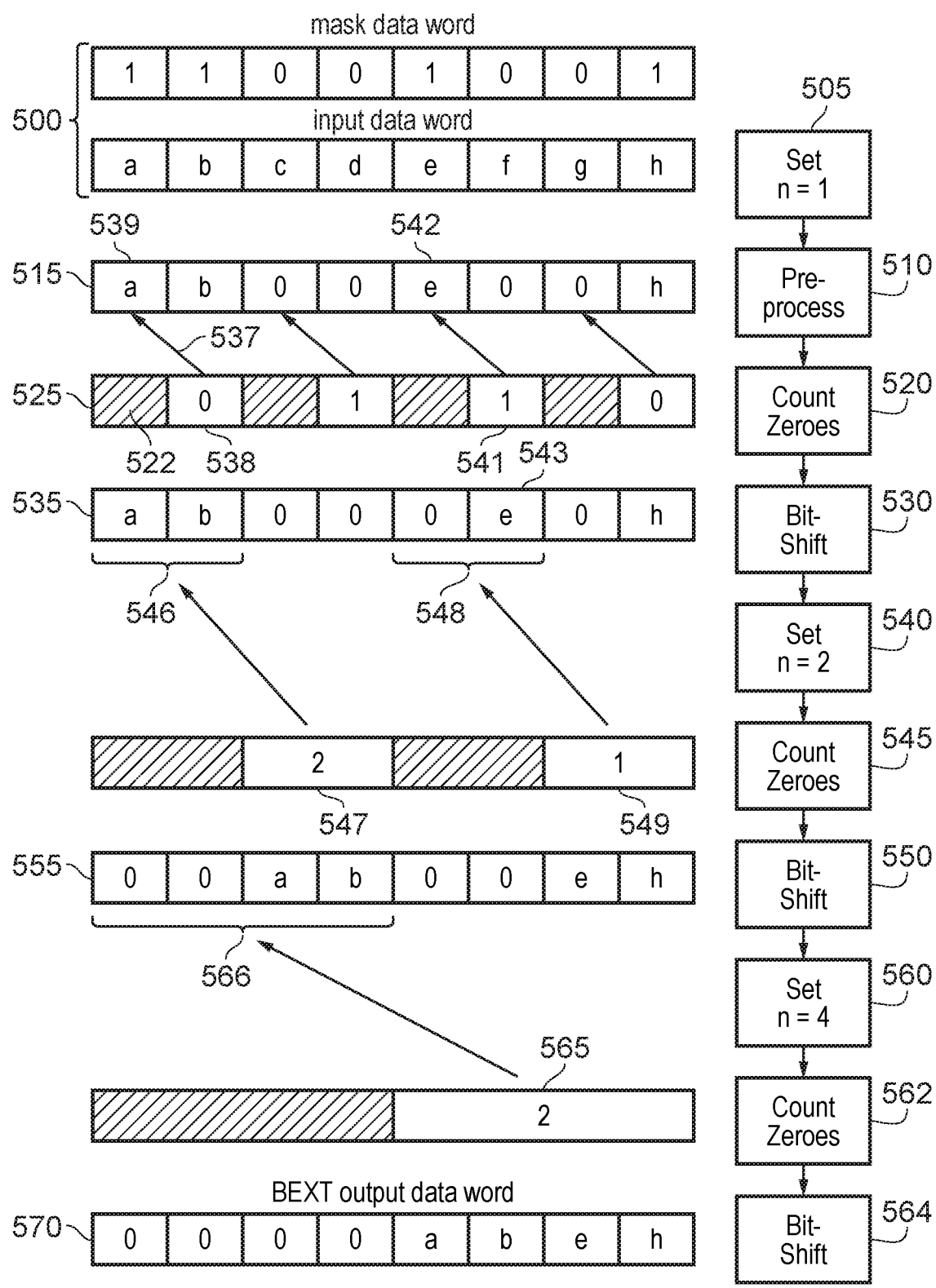
FIGS. 5 to 7 schematically illustrate examples of BEXT processing.
Figure 6:
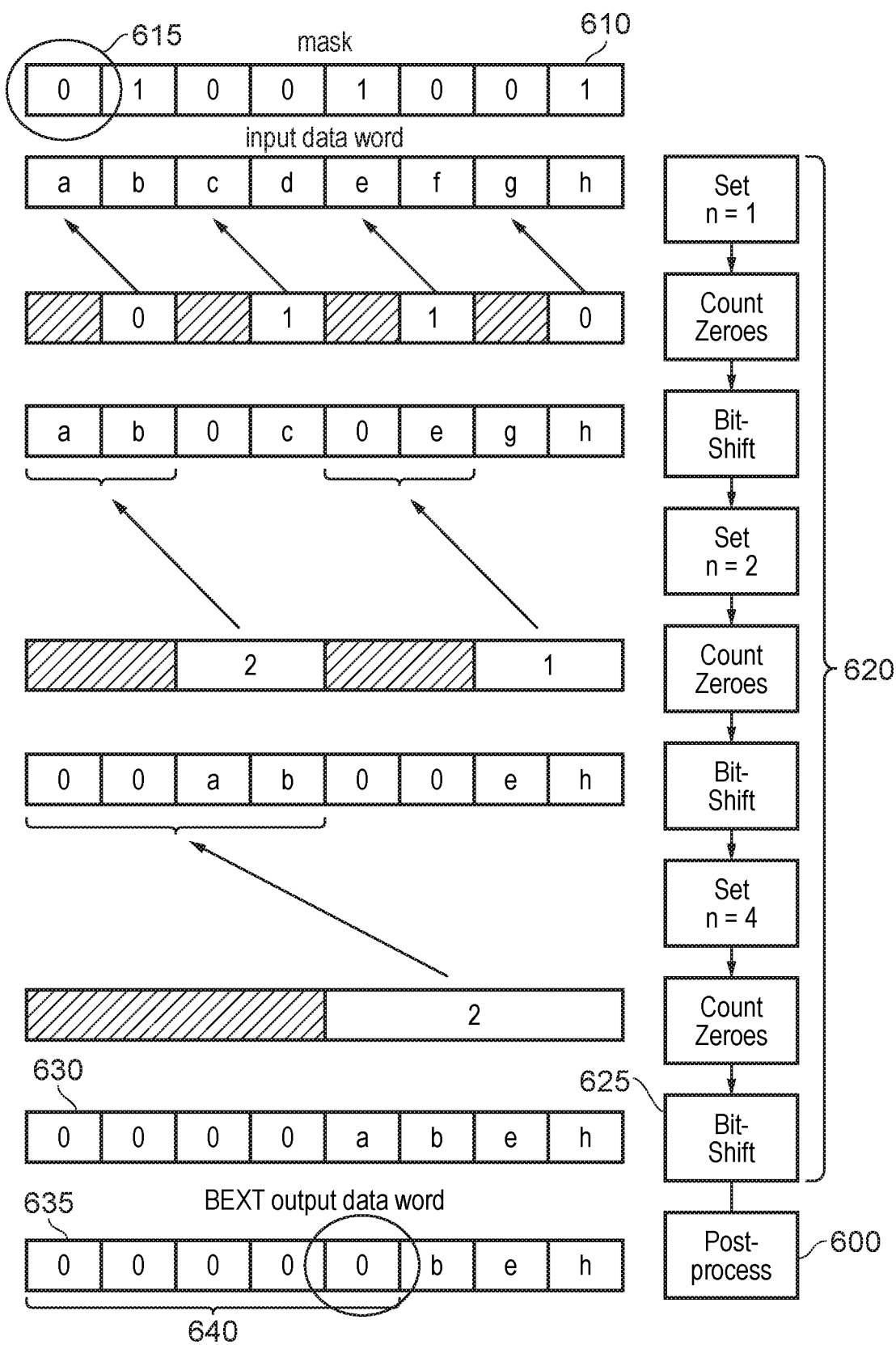
Figure 7:
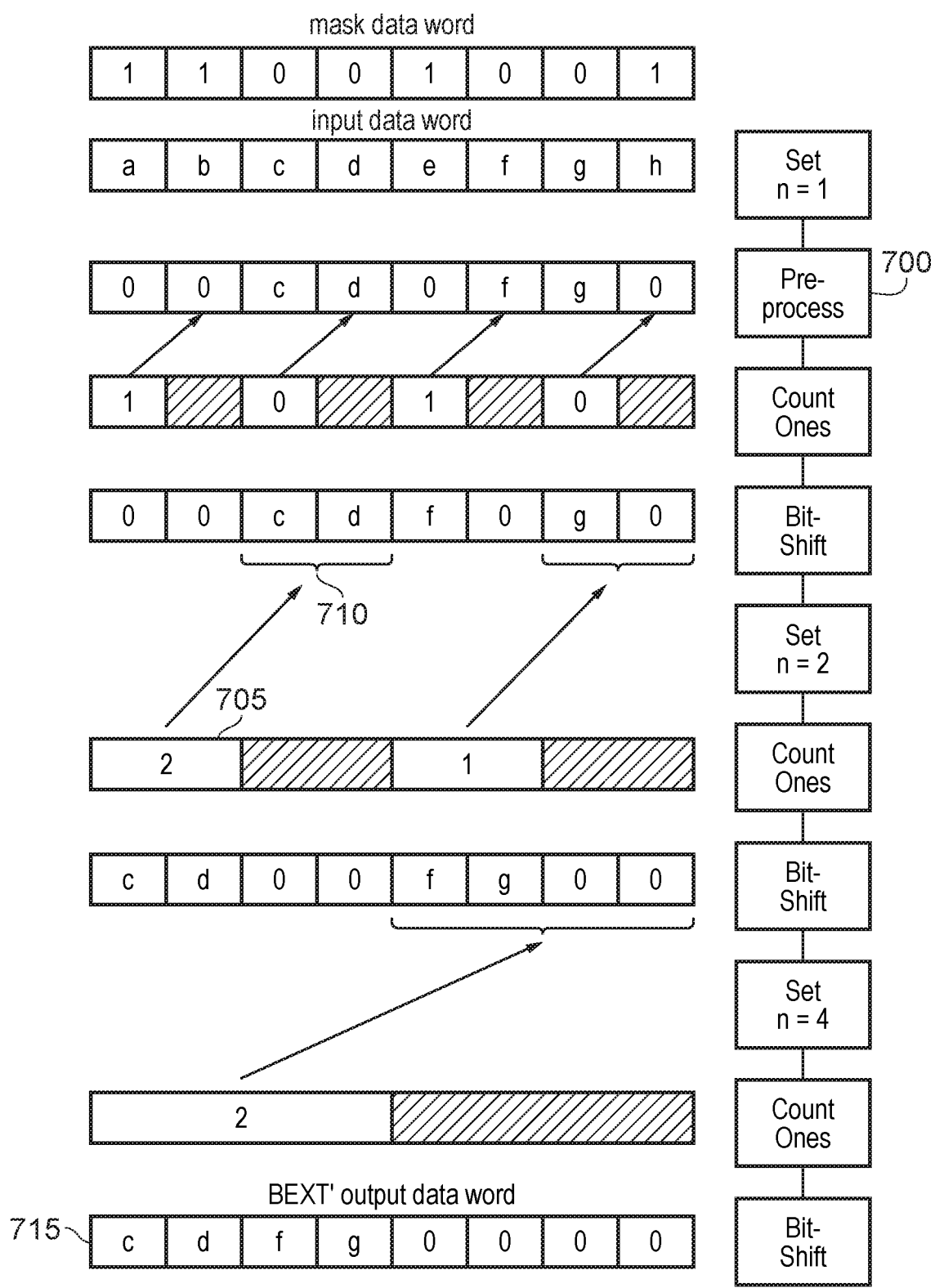

FIGS. 5 to 7 schematically illustrate examples of the BEXT and the BEXT' operations referred to above, making use of counter and bit-shift circuitry which provides a succession of processing stages, each comprising a count operation stage and a corresponding bit-shift stage.

In FIGS. 5 to 7, bit values of various input, output and intermediate words are shown at vertical positions within the drawings, which are aligned with process steps of a flow chart illustrating procedural aspects of the calculations.

Referring first to FIG. 5, an example of BEXT processing using a pre-processing step will be discussed. An upper two rows 500 of FIG. 5 provide a schematic example of a mask data word and an input data word.

At a step 505, an index value n is set to n=1.

At a pre-processing step 510, bit positions in the input data word for which the mask data word has a zero are set to a value of 0, resulting in the intermediate data word 515 of FIG. 5.

Then, at a step 520 a count is made of the number of zeros (zero being a predetermined bit value applicable to BEXT processing) in the mask data word. This count is performed for a first set of alternate instances of n-bit groups of bit positions. At this stage in the processing, n is equal to 1 so the count is carried out for alternate single bit positions for the mask data word. Bit positions shown shaded such as a bit position 522 may be counted but are irrelevant to this particular aspect of the processing. So, the unshaded bit positions in the count values 525 represent the number of zeros at corresponding bit positions in the mask data word.

At a bit-shifting step 530, the first bit-shift stage is configured to generate a bit-shifted data word 535 by bit-shifting bits of the data word 515 for a second set of alternate instances of the n-bit groups of bit positions, complimentary to the first set (in other words, for bit positions indicated by schematic arrows 537) by respective numbers of bit positions depended upon the count values discussed above. So, for example, the count value 538 is used to right-shift the bit position 539 in the data word 515. Since this count value happens to be 0, the input bit "a" remains in the same place. By contrast, since the count value 541 is used to shift the bit position 542, it will be seen that the input bit "e" is right-shifted to a position 543 in the shifted data word 535.

At a step 540, for a next processing stage, the index n is set to 2. Then, at a step 545, the count operation stage of the second processing stage generates, for a set of alternate instances of two-bit groups of bit positions (namely instances 547, 549) counts of zeros in the mask data word add those groups of bit positions. These are applied as shift amounts to groups 546, 548 of bit positions in the word 535 to generate, at a bit-shifting stage 550, a data word 555.

The index n doubles from processing stage to processing stage, so for a third processing stage, n is set to 4 at a step 560. A count is made (at a step 562) of the number of zeros in alternate 4-bit groups, namely a group 565 of bit positions in the mask data word and this is applied (at a step 564) as a shift amount to a 4-bit complimentary group 566 in the word 555. When these bits 566 are write-shifted by 2 bit positions (the count value of the group 565, the result is the BEXT output data word applicable to the mask and input data words 500, namely an output data word 570.

FIG. 6 schematically illustrates a similar arrangement in which the counting and bit-shifting arrangement is identical to that shown in FIG. 5, but in which a post-processing stage 600 is provided instead of the pre-processing stage discussed in FIG. 5.

Note that purely for the purposes of the description clearly demonstrating the use of the post-processing stage, a different mask data word 610 is provided in FIG. 6 compared to that used in FIG. 5. In particular, a most significant bit 615 is a 0 in FIG. 6 whereas that bit is a 1 in FIG. 5.

Once again, 3 processing stages each comprising a count operation stage and a corresponding bit-shift stage are provided as a succession of steps 620. These operate in the same manner as those shown in FIG. 5 and so will not be discussed again in detail. However, in the absence of the pre-processing stage, the final bit-shift stage 625 results in an intermediate data word 630. The post-processing stage 600 is then applied to generate the output data word 635.

The post-processing stage 600 may be performed by post-processing circuitry to generate the output data word 635 from the bit-shifted data word 630 generated by the last of the succession of processing stages, by setting to 0 a number of contiguous bits 640 of the bit-shifted data word 630 in dependence upon how many bit positions (in this example, 5) of the mask data word 610 have the predetermined bit value (which is 0 in the case of the BEXT operation).

In the BEXT operation (FIGS. 5 and 6) and for a predetermined bit value of 0 and for adjacent pair of the contiguous n-bit groups, the bit-shift circuitry is configured to right-shift an n-bit group of the data word to be processed, at a more significant position in the adjacent pair, by a number of bit positions dependent upon a count value indicating a number of bits of the predetermined bit value with respect to an n-bit group at an less significant group position of the adjacent pair. For example, the bit positions (539, 537), (541, 542), (547, 546), (549, 548), (565, 566) form examples of such adjacent pairs of n-bit groups.

FIG. 7 schematically illustrates the BEXT' operation discussed above, which may be used as part of the processing to generate a BGRP output.

Substantially identical processing is used to that shown in FIG. 5, including a pre-processing stage (though note that instead a post-processing stage could be used). Here, however, the predetermined bit value is 1, the pre-processing stage 700 involves setting to 0 all those bits of the input data word at bit positions for which the mask data word is a 1, and the complimentary alternate instances of n-bit groups are inverted with respect to those shown in FIG. 5. This means that, for example, a 2-bit group 705 generates a count of bits having a value of 1 in the mask data word, with that count being used to left-shift (rather than right-shift) an adjacent complimentary group 710. The output of the final processing stage is the BEXT' output data word 715 which, as discussed above, may be combined by a bitwise logical OR combination with the BEXT data word to generate the BGRP data word.

For the BEXT' operation and for a predetermined bit value of 1 and for each adjacent pair of the contiguous n-bit groups, the bit-shift circuitry is configured to left-shift an n-bit group of the data word to be processed, at a less significant group position of the adjacent pair, by a number of bit positions dependent upon a count value indicating a number of bits of the predetermined bit value with respect to an n-bit group at a more significant group position of the adjacent pair.

As discussed above, the bit-processing circuitry may be provided as counter and bit-shift circuitry providing a succession of processing stages. In the context of FIG. 5, a first such stage executes the steps 505, 520 and 530. A second such stage executes the steps 540, 545, 550. A third such stage executes the steps 560, 562, 564.

Figure 8:
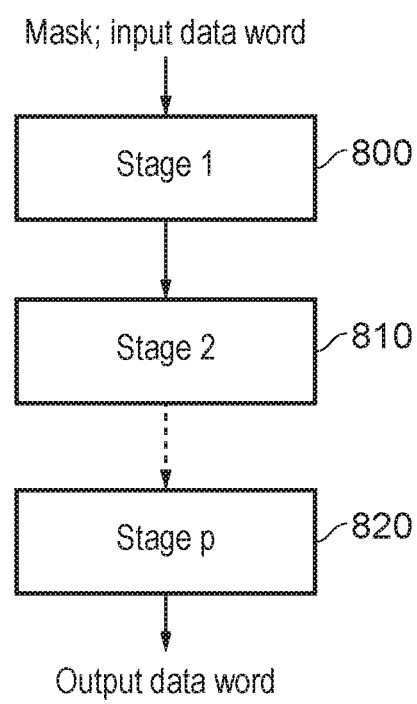
FIGS. 8 and 9 schematically illustrate examples of a multi-stage apparatus.

As shown in FIG. 8, which excludes the pre- or post-processing stages for clarity of this aspect of the description, these processing stages may be implemented as successive discrete stages of circuitry so that the results of a first processing stage 800 (with n=1) are passed as input to a second processing stage 810 with n=2, and so on through to a last processing stage p 820 which generates the output data word. This arrangement allows pipelining to be performed so that while a particular bit permutation operation is being performed by one of the stages, one of the stages may be performing different bit permutation operations so that the set of bit permutation operations steps through the apparatus in a pipelined manner. The pre-processing stage may precede the stage 800 or the post-processing stage may follow the stage 820.

Figure 9:
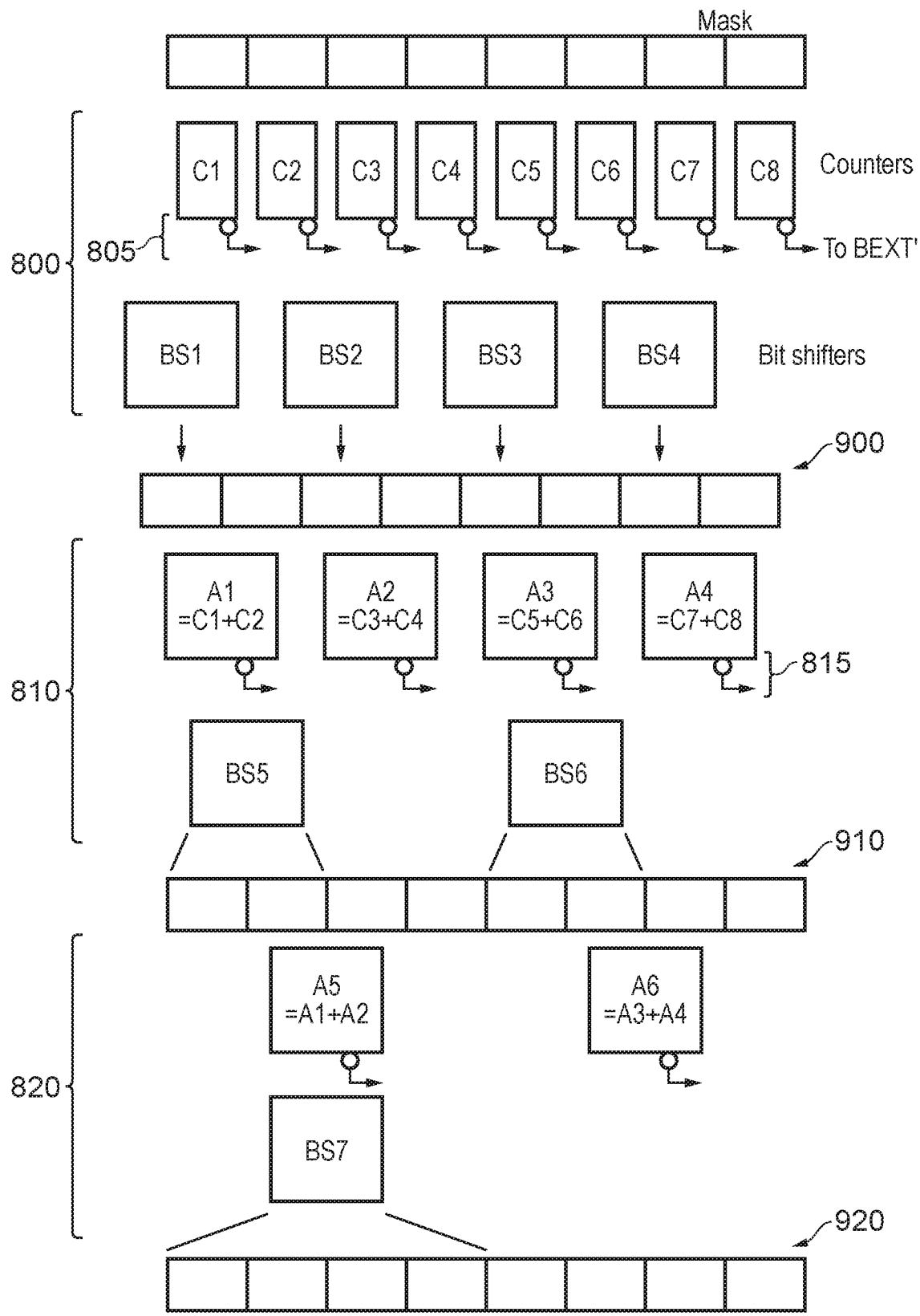

FIG. 9 provides a specific example of a three-stage bit processing apparatus of the type shown in FIG. 8, once again excluding the pre- or post-processing stages for now. Assume that the circuitry of FIG. 9 performs at least BEXT processing as described above.

The stage 800 comprises a set of counters C1 . . . C8 and a set of bit-shifters BS1 . . . BS4 each operating with respect to contiguous 1-bit groups of bit positions in the manner shown in FIGS. 5 to 7. Note that the counters C1, C3, C5, C7 are not required for a first stage of BEXT processing. However, eight counters are in fact provided in order that their results can be used by subsequent processing stages as described below. Also, a complementary output 805 from each counter is provided via the data connection 450 to BEXT' processing circuitry, given that the numbers of zeroes counted by the counters C1 . . . C8 are each equal to 1—(number of ones).

It will be appreciated that counting the number of zeroes in a one-bit data input is not a difficult processing task. Indeed, for a data bit Bn, the number of zeroes can be taken as (1-Bn) or NOT Bn. The respective complementary output 805 (number of ones in Bn) can be taken as Bn itself.

The bit-shifters BS1 . . . BS4, under the control of the counters C2, C4, C6, C8, generate an intermediate data word 900 which is passed as an input to the stage 810.

The stage 810 could use a further set of counters, but this is not in fact necessary, as instead a set of adders A1 . . . A4 can combine the results of respective pairs of counters C1 . . . C8 to generate the two-bit count values required at the second stage. The count values relevant to bit-shifters BS5, BS6 are A2=C3+C4 and A4=C7+C8. Note that the other adders A1 and A3 are provided in order to provide information to the third stage (in the case of A3) and to provide complementary information to a BEXT' circuitry via complementary outputs (2 minus the count value) 815. Bit-shifters BS5, BS6 generate an intermediate data word 910 to be passed to a third stage 820.

The third stage 820 comprises two further adders A5=A1+A2 and A6=A3+A4, again providing a complementary (4 minus the count value) output to BEXT' circuitry and a bit-shifter BS7 which acts under the control of the adder A6 to generate a data word 920.

Note that further counters could be used in place of the adders A1 . . . A6. But in the present examples, the adders provide the functionality of counters by adding together previously generated count values. Therefore, the use of adders A1 . . . A6 to add together previously counted values provides the functionality of a respective counter stage at the processing stages 810, 820.

The re-use of count values and the sharing of values between BEXT and BEXT' provide an efficient circuitry or apparatus to achieve these bit permutation operations.

In other examples, a common apparatus could be used to implement each of the processing stages so that for all except the final processing stage, the output of the counter and bit-shift circuitry is returned as an input to the same counter and bit-shift circuitry and the processing repeated, but with a next value of n.

Figure 10:
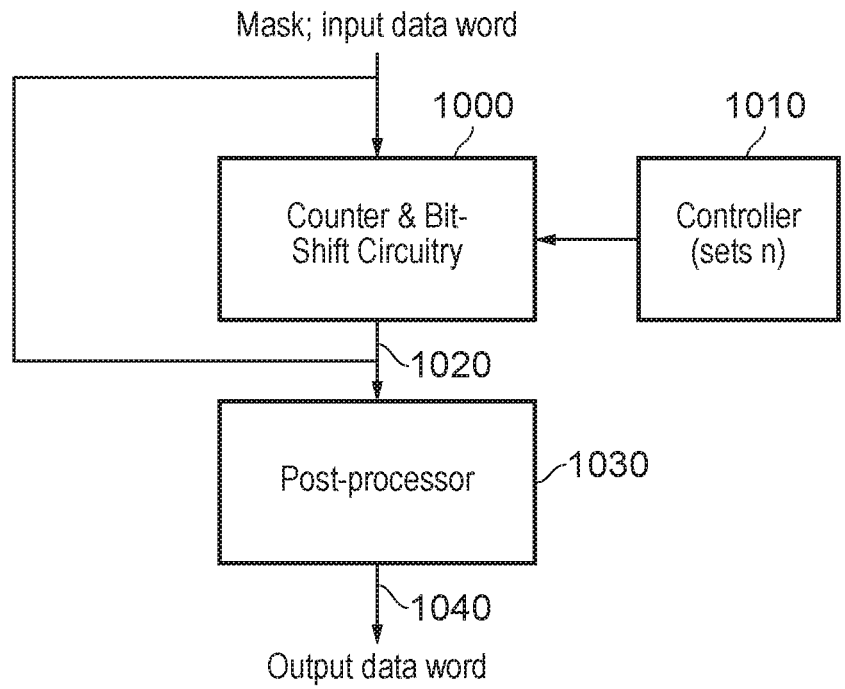
FIGS. 10 and 11 schematically illustrate post-processing and pre-processing respectively.

In FIG. 10, counter and bit-shift circuitry 1000 operates in this manner, under the control of a controller 1010 which sets the value n for each iteration of operation of the counter and bit-shift circuitry 1000. At a final stage, the output data word is generated by passing the results of the counter and bit-shift circuitry (a data word 1020) to a post processor 1030 to carry out the post-processing stage discussed above in order to generate the output data word 1040.

Figure 11:
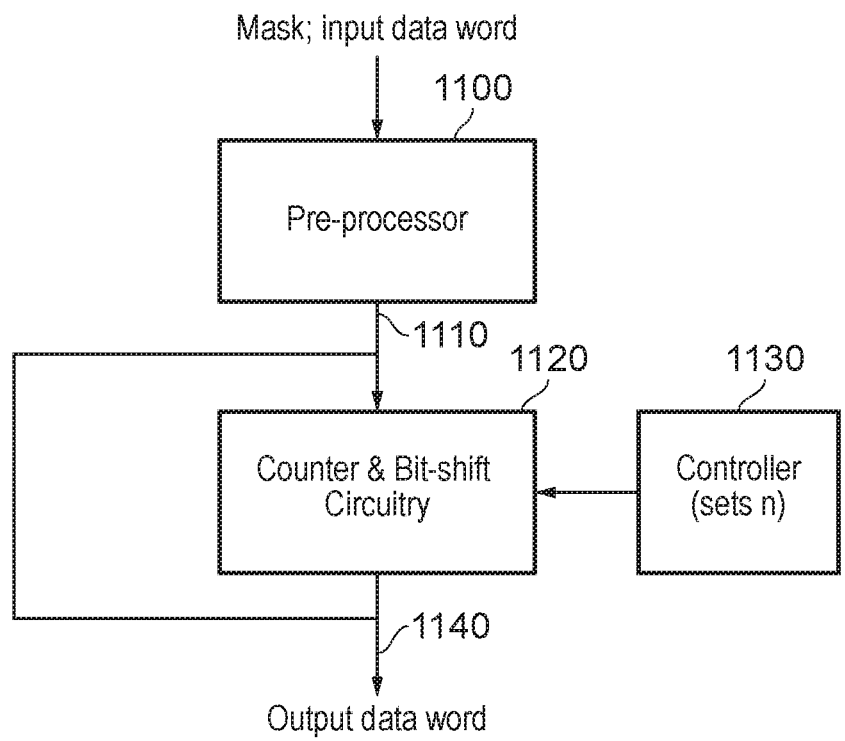

In FIG. 11, a pre-processing stage 1100 is used before the pre-processed data word 1110 is passed as an input to the counter and bit-shift circuitry 1120 which performs multiple iterations of the processing discussed above under the control of a controller 1130 which sets the value n for example, with the output of the last stage being provided as the output data word 1140.

Therefore, FIG. 8, 10 or 11, operating according to the principles discussed with reference to FIGS. 5 to 7, provide respective examples of bit processing apparatus comprising:

counter and bit-shift circuitry (800-820, or 1000, or 1120) to provide a succession of processing stages each comprising a count operation stage and a corresponding bit-shift stage (carrying out the steps 505/520/530; 540/545/550; and 560/562/564 for example), each processing stage operating with respect to a set of contiguous n-bit groups of bit positions, where n is 1 for a first processing stage and n doubles from one processing stage in the succession of processing stages to a next processing stage in the succession of processing stages;

each count operation stage being configured to generate, for a first set of alternate instances 538, 547, 565 of the n-bit groups of bit positions, count values indicating a respective number of bits of a predetermined bit value in a mask data word; and each bit-shift stage being configured to generate a bit-shifted data word by bit-shifting bits 539, 546, 566 of a data word to be processed, for a second set of alternate instances of the n-bit groups of bit positions complementary to the first set, by respective numbers of bit positions dependent upon the count values generated by the respective count operation stage, in which the bit-shifted data word for one bit-shift stage in the succession of processing stages is used as the data word to be processed by the next bit-shift stage in the succession of processing stages.

Figure 12:
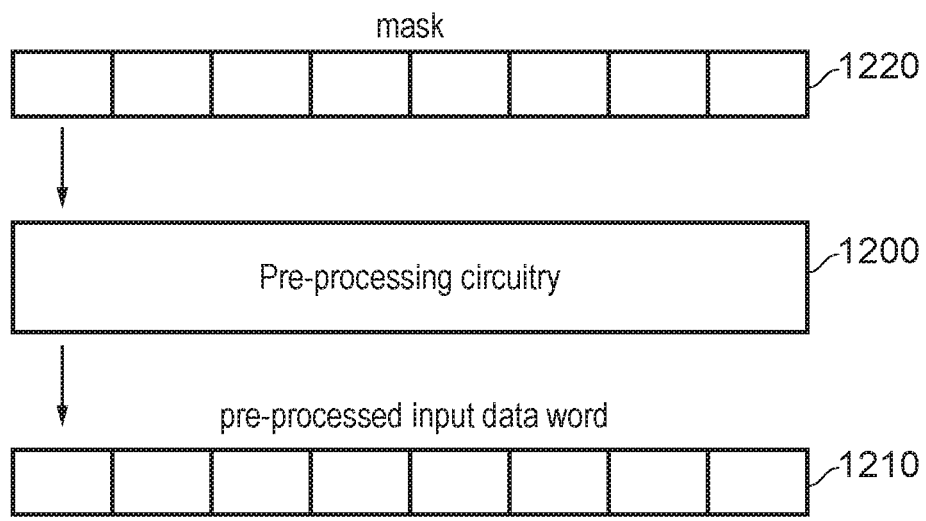
FIGS. 12 and 13 schematically illustrate pre-processing and post-processing respectively.

FIG. 12 schematically illustrates an example of pre-processing circuitry 1200 which generates a data word 1210 to be processed by the first processing stage or the first iteration of the processing circuitry by setting to 0 any bits of the input data word to which corresponding bit positions of the mask data word 1220 of the predetermined bit value.

FIG. 12 therefore provides an example of the use of pre-processing circuitry to generate a data word to be processed by the first processing stage from an input data word by setting to 0 any bits of the input data word for which corresponding bit positions of the mask data word have the predetermined bit value.

Figure 13:
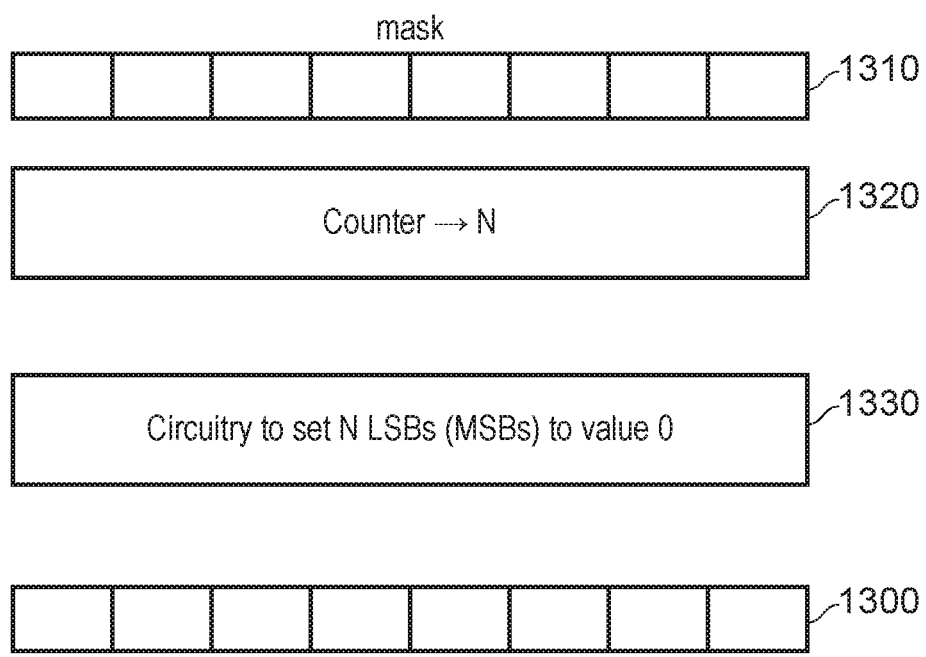

FIG. 13 schematically illustrates an example of post-processing circuitry to generate an output data word 1300 from the bit-shifted data word generated by the last of the succession of processing stages, by setting to 0 a number of contiguous bits of the bit-shifted data word in dependence upon how many bit positions of the mask data word 1310 have the predetermined bit value.

This can be performed, for example, by a counter 1320 which counts a value N representing the number of bit positions of the mask data word having the predetermined bit value and circuitry 1330 to set the N least significant bits or most significant bits (depending on whether the operation is BEXT dashed or BEXT to a value 0.

FIG. 13 therefore provides an example of the use of post-processing circuitry to generate an output data word from the bit-shifted data word generated by the last of the succession of processing stages, by setting to 0 a number of contiguous bits of the bit-shifted data word in dependence upon how many bit positions of the mask data word have the predetermined bit value. Depending on whether the BEXT' or BEXT operation is being performed, the 4 post-processing circuitry is configured to set to 0:
one or more least significant bits; or
one or more most significant bits.

BDEP Operation Example

In the BDEP permutation operation, data bits (from least to most significant) are deposited into the output according to the contents of the mask. For each mask bit, if mask=1, a data bit is deposited into the output. Otherwise the output bit is set to 0.

Figure 14:
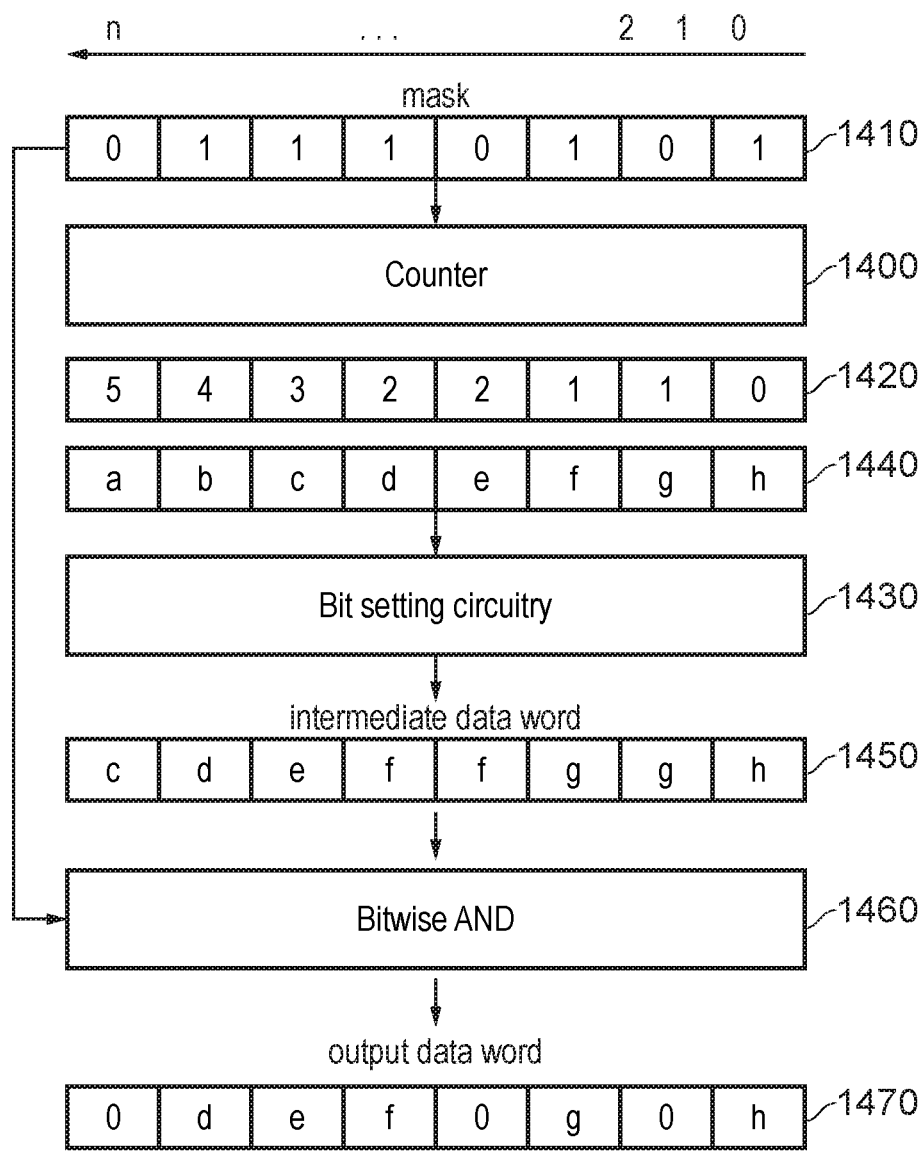
FIG. 14 schematically illustrates a BDEP apparatus.

FIG. 14 schematically represents an example of the BDEP processor 220 of FIG. 3. A counter 1400 is configured to count, for each bit position, n, in the mask data word 1410, the number of instances m, of a predetermined bit value (such as a bit value of 1) in all bit positions of the mask data word less significant than the bit position n. An example of the count result for the mask data word 1400 is shown as a data word 1420.

Note that the counter 1400 can make use, at least for a part of its functionality, of the counters of FIG. 9 which are used to implement the BEXT and BEXT' functions. Again this provides for efficiencies of circuitry design and implementation.

Bit setting circuitry 1430 acts on the input data word 1430 to set a bit at a bit position n in an intermediate data word 1450 to be equal to the bit at the bit position m in the input data word 1440.

For example, the count for the bit position 5 is a count of 3. The bit at bit position 3 in in the input data word is "e". Therefore in the intermediate data word, the bit position 5 is occupied by "e".

Output circuitry 1460, for example a bitwise logical AND circuitry, generate the output data word 1470 as a logical combination (such as a bitwise AND combination of the intermediate data word 1450 and the mask data word 1410.

FIG. 14 therefore provides an example of bit processing apparatus comprising:

counter circuitry 1400 configured to count, for each bit position, n, in a mask data word, the number of instances, m, of a predetermined bit value in all bit positions of the mask data word less significant than the bit position n;

bit setting circuitry 1430 to set a bit at a bit position n in an intermediate data word to be equal to a bit at a bit position m in an input data word; and output circuitry 1460 configured to generate an output data word as a logical combination of the intermediate data word and the mask data word. For example, the logical combination may be a bitwise logical AND combination.

Figure 15:
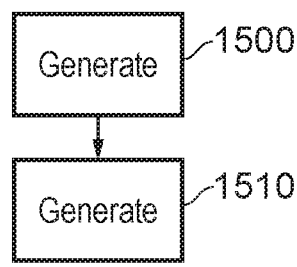
FIGS. 15 and 16 are schematic flowcharts illustrating respective methods.

FIG. 15 is a schematic flowchart illustrating a method comprising:

for a succession of processing stages each comprising a count operation stage and a corresponding bit-shift stage, each processing stage operating with respect to a set of contiguous n-bit groups of bit positions, where n is 1 for a first processing stage and n doubles from one processing stage in the succession of processing stages to a next processing stage in the succession of processing stages:

each count operation stage generating (at a step 1500), for a first set of alternate instances of the n-bit groups of bit positions, count values indicating a respective number of bits of a predetermined bit value in a mask data word; and each bit-shift stage generating (at a step 1510) a bit-shifted data word by bit-shifting bits of a data word to be processed, for a second set of alternate instances of the n-bit groups of bit positions complementary to the first set, by respective numbers of bit positions dependent upon the count values generated by the respective count operation stage, in which the bit-shifted data word for one bit-shift stage in the succession of processing stages is used as the data word to be processed by the next bit-shift stage in the succession of processing stages.

Figure 16:
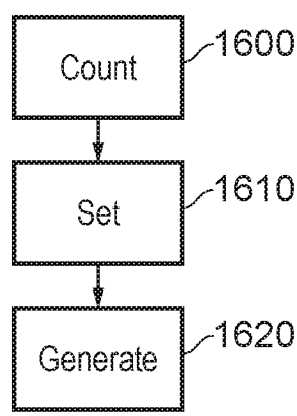

FIG. 16 is a schematic flowchart illustrating a method comprising counting (at a step 1600), for each bit position, n, in a mask data word, the number of instances, m, of a predetermined bit value in all bit positions of the mask data word less significant than the bit position;

setting a bit at a bit position n in an intermediate data word to be equal to a bit at a bit position m in an input data word; and generating an output data word as a logical combination of the intermediate data word and the mask data word.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

We claim:
1. Apparatus comprising:
counter and bit-shift circuitry to provide a succession of processing stages each comprising a count operation stage and a corresponding bit-shift stage, each processing stage operating with respect to a set of contiguous n-bit groups of bit positions, where n is 1 for a first processing stage and n doubles from one processing stage in the succession of processing stages to a next processing stage in the succession of processing stages;
each count operation stage being configured to generate, for a first set of alternate instances of the n-bit groups of bit positions, count values indicating a respective number of bits of a predetermined bit value in a mask data word; and
each bit-shift stage being configured to generate a bit-shifted data word by bit-shifting bits of a data word to be processed, for a second set of alternate instances of the n-bit groups of bit positions complementary to the first set, by respective numbers of bit positions dependent upon the count values generated by the respective count operation stage, in which the bit-shifted data word for one bit-shift stage in the succession of processing stages is used as the data word to be processed by the next bit-shift stage in the succession of processing stages.

2. Apparatus according to claim 1, comprising pre-processing circuitry to generate a data word to be processed by the first processing stage from an input data word by setting to 0 any bits of the input data word for which corresponding bit positions of the mask data word have the predetermined bit value.

3. Apparatus according to claim 1, comprising post-processing circuitry to generate an output data word from the bit-shifted data word generated by the last of the succession of processing stages, by setting to 0 a number of contiguous bits of the bit-shifted data word in dependence upon how many bit positions of the mask data word have the predetermined bit value.

4. Apparatus according to claim 3, in which the post-processing circuitry is configured to set to 0:
one or more least significant bits; or
one or more most significant bits.

5. Apparatus according to claim 1, in which:
for a predetermined bit value of 0 and for adjacent pair of the contiguous n-bit groups, the bit-shift circuitry is configured to right-shift an n-bit group of the data word to be processed, at a more significant position in the adjacent pair, by a number of bit positions dependent upon a count value indicating a number of bits of the predetermined bit value with respect to an n-bit group at an less significant group position of the adjacent pair.

6. Apparatus according to claim 1, in which:
for a predetermined bit value of 1 and for each adjacent pair of the contiguous n-bit groups, the bit-shift circuitry is configured to left-shift an n-bit group of the data word to be processed, at a less significant group position of the adjacent pair, by a number of bit positions dependent upon a count value indicating a number of bits of the predetermined bit value with respect to an n-bit group at a more significant group position of the adjacent pair.

7. Apparatus comprising:
first and second apparatus each comprising counter and bit-shift circuitry to provide a succession of processing stages each comprising a count operation stage and a corresponding bit-shift stage, each processing stage operating with respect to a set of contiguous n-bit groups of bit positions, where n is 1 for a first processing stage and n doubles from one processing stage in the succession of processing stages to a next processing stage in the succession of processing stages; each count operation stage being configured to generate, for a first set of alternate instances of the n-bit groups of bit positions, count values indicating a respective number of bits of a predetermined bit value in a mask data word; and each bit-shift stage being configured to generate a bit-shifted data word by bit-shifting bits of a data word to be processed, for a second set of alternate instances of the n-bit groups of bit positions complementary to the first set, by respective numbers of bit positions dependent upon the count values generated by the respective count operation stage, in which the bit-shifted data word for one bit-shift stage in the succession of processing stages is used as the data word to be processed by the next bit-shift stage in the succession of processing stages;
in which, in the first apparatus, for a predetermined bit value of 0 and for adjacent pair of the contiguous n-bit groups, the bit-shift circuitry is configured to right-shift an n-bit group of the data word to be processed, at a more significant position in the adjacent pair, by a number of bit positions dependent upon a count value indicating a number of bits of the predetermined bit value with respect to an n-bit group at an less significant group position of the adjacent pair;
in which, in the second apparatus, for a predetermined bit value of 1 and for each adjacent pair of the contiguous n-bit groups, the bit-shift circuitry is configured to left-shift an n-bit group of the data word to be processed, at a less significant group position of the adjacent pair, by a number of bit positions dependent upon a count value indicating a number of bits of the predetermined bit value with respect to an n-bit group at a more significant group position of the adjacent pair;
in which the first apparatus and the second apparatus are configured to operate with respect to a common input data word and a common mask data word; and
combiner circuitry to combine the bit-shifted data word generated by the first apparatus and the bit-shifted data word generated by the second circuitry to generate an output data word.

8. Apparatus according to claim 7, in which the combiner circuitry is configured to provide a bitwise logical OR combination.

9. Apparatus according to claim 7, comprising:
third apparatus having counter circuitry configured to count, for each bit position, n, in a mask data word, the number of instances, m, of a predetermined bit value in all bit positions of the mask data word less significant than the bit position n; bit setting circuitry to set a bit at a bit position n in an intermediate data word to be equal to a bit at a bit position m in an input data word; and output circuitry configured to generate an output data word as a logical combination of the intermediate data word and the mask data word.

10. Apparatus comprising:
counter circuitry configured to count, for each bit position, n, in a mask data word, the number of instances, m, of a predetermined bit value in all bit positions of the mask data word less significant than the bit position n;
bit setting circuitry to set a bit at a bit position n in an intermediate data word to be equal to a bit at a bit position m in an input data word; and output circuitry configured to generate an output data word as a logical combination of the intermediate data word and the mask data word.

11. Apparatus according to claim 10, in which the logical combination is a bitwise logical AND combination.

12. A method comprising:

for a succession of processing stages each comprising a count operation stage and a corresponding bit-shift stage, each processing stage operating with respect to a set of contiguous n-bit groups of bit positions, where n is 1 for a first processing stage and n doubles from one processing stage in the succession of processing stages to a next processing stage in the succession of processing stages:

each count operation stage generating, for a first set of alternate instances of the n-bit groups of bit positions, count values indicating a respective number of bits of a predetermined bit value in a mask data word; and each bit-shift stage generating a bit-shifted data word by bit-shifting bits of a data word to be processed, for a second set of alternate instances of the n-bit groups of bit positions complementary to the first set, by respective numbers of bit positions dependent upon the count values generated by the respective count operation stage, in which the bit-shifted data word for one bit-shift stage in the succession of processing stages is used as the data word to be processed by the next bit-shift stage in the succession of processing stages.

13. A method comprising:

counting, for each bit position, n, in a mask data word, the number of instances, m, of a predetermined bit value in all bit positions of the mask data word less significant than the bit position;

setting a bit at a bit position n in an intermediate data word to be equal to a bit at a bit position m in an input data word; and generating an output data word as a logical combination of the intermediate data word and the mask data word.

* * * * *